United States Patent
Minami

(12) United States Patent    (10) Patent No.: US 6,823,660 B2
(45) Date of Patent: Nov. 30, 2004

(54) EXHAUST EMISSION PURIFICATION SYSTEM FOR DIESEL ENGINE

(75) Inventor: Toshitaka Minami, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/309,815

(22) Filed: Dec. 5, 2002

(65) Prior Publication Data

US 2003/0110761 A1 Jun. 19, 2003

(30) Foreign Application Priority Data

Dec. 13, 2001    (JP) ........................................ 2001-380294

(51) Int. Cl.[7] ................................................ F01N 5/04
(52) U.S. Cl. .......................... 60/280; 60/288; 60/295; 60/297; 60/300; 60/324
(58) Field of Search .................... 60/285, 286, 287, 60/288, 295, 296, 297, 300, 303, 311, 324, 280; 422/169, 170, 171, 177, 182

(56) References Cited

U.S. PATENT DOCUMENTS

| | | | | |
|---|---|---|---|---|
| 3,791,143 A | * | 2/1974 | Keith et al. ................... | 60/274 |
| 4,211,075 A | * | 7/1980 | Ludecke et al. ............... | 60/285 |
| 4,835,963 A | * | 6/1989 | Hardy .......................... | 60/286 |
| 5,085,049 A | * | 2/1992 | Rim et al. ..................... | 60/288 |
| 5,349,816 A | * | 9/1994 | Sanbayashi et al. .......... | 60/277 |
| 5,433,074 A | * | 7/1995 | Seto et al. ..................... | 60/286 |
| 5,489,319 A | * | 2/1996 | Tokuda et al. ................. | 60/311 |
| 5,517,820 A | * | 5/1996 | Kuroda et al. ................. | 60/274 |
| 6,192,675 B1 | * | 2/2001 | Hirota et al. .................. | 60/288 |
| 6,212,885 B1 | * | 4/2001 | Hirota et al. .................. | 60/288 |
| 6,233,927 B1 | * | 5/2001 | Hirota et al. .................. | 60/297 |
| 6,314,722 B1 | * | 11/2001 | Matros et al. ................. | 60/296 |

FOREIGN PATENT DOCUMENTS

JP            6-108884    *   4/1994

* cited by examiner

*Primary Examiner*—Tu M. Nguyen
(74) *Attorney, Agent, or Firm*—Staas & Halsey LLP

(57) ABSTRACT

A first exhaust emission purification device first and a second exhaust emission purification device, each have a continuously regenerating type DPF and an SCR catalyst to constitute exhaust emission purification system for a diesel engine. When the exhaust gas temperature is within a low-temperature region lower than a predetermined temperature region, the exhaust gas temperature is raised.

9 Claims, 6 Drawing Sheets

EXHAUST EMISSION PURIFICATION SYSTEM FOR DIESEL ENGINE

BACKGROUND OF THE INVENTION

The present invention relates to an exhaust emission purification system for a diesel engine which cleans up particulate matter (hereinafter, referred to as PM) and NOx (nitrogen oxide) in exhaust gas from an engine such as a diesel engine.

As regards discharge of PM to be discharged from the diesel engine, a restriction has been enhanced together with NOx, CO (carbon monoxide), unburned hydrocarbon and the like year by year, and there has been developed a technique by which this PM is collected by a filter called "Diesel Particulate Filters" (hereinafter, referred to as DPF) to reduce an amount of PM to be discharged outwardly.

For DPF for directly collecting this PM, there are a wall flow type monolithic honeycomb filter made of ceramic, a fiber type filter obtained by making ceramic or metal into a fibrous shape, and the like. An exhaust emission purification device using these DPFs is arranged in an exhaust pipe of an engine to clean up exhaust gas to be generated by the engine.

In this DPF, however, clogging develops as PM is collected and exhaust gas pressure (exhaust pressure) is increased, and therefore, it is necessary to remove the PM collected by this DPF, and several methods and systems have been developed.

Among them, there are a system for burning and removing PM by heating the filter with an electric heater or a burner, and a system for inverse-washing by flowing air in the opposite direction. In the case of these systems, however, since energy for heating is supplied from the outside to burn PM, there are a problem for worsening fuel consumption and a problem that it is difficult to control regeneration.

Also, when any of these systems is adopted, in the majority of cases, the structure is arranged such that there are provided two lines of exhaust passages each having a filter, and collection of PM and regeneration of the filter are alternately repeated in each exhaust passage. For this reason, the system becomes large and the cost is also prone to be increased.

In order to cope with these problems, there has been proposed a continuously regenerating type DPF system in which regeneration temperature of the filter is lowered to reduce an amount of energy supplied from the outside, and exhaust heat from the engine is utilized to regenerate the filter. In this system, a wall flow type filter and a catalyst are combined. This filter is constructed such that a multiplicity of exhaust passages (cells) whose periphery is enclosed with a porous wall surface are formed and an inlet side and an outlet side of these exhaust passages are sealed in a zigzag shape, respectively.

In this system, since regeneration of the filter and PM collection are basically performed continuously and an exhaust passage becomes one line of system, control of regeneration is also simplified. This system has the following three types.

A first type is a nitrogen dioxide regenerating type DPF system, and is composed of an oxidation catalyst on the upstream side and a wall flow type filter on the downstream side. Through the use of this oxidation catalyst such as platinum, NO (nitrogen monoxide) in the exhaust gas is oxidized. Through the use of $NO_2$ (nitrogen dioxide) generated by this oxidization, PM collected by the filter is oxidized into $CO_2$ (carbon dioxide) to remove the PM. The oxidation of PM due to this $NO_2$ has lower energy barrier than the oxidation of PM due to $O_2$ (oxygen) and is performed at, low temperature. For this reason, thermal energy in the exhaust gas is utilized, whereby PM can be oxidized and removed while the PM is continuously being collected to regenerate the filter.

Also, a second type is an integrated model nitrogen dioxide regenerating DPF system, and is an improvement of the first system. This system is formed by coating a wall surface of the wall flow type filter with the oxidation catalyst. This wall surface performs both oxidation of NO in the exhaust gas and oxidation of PM due to $NO_2$. Thereby, the system is simplified.

Thus, a third DPF system with a PM oxidation catalyst is formed by a precious metal oxidation catalyst such as platinum and a wall flow type filter with PM oxidation catalyst obtained by coating the wall surface with PM oxidation catalyst This wall surface oxidizes PM at lower temperature. This PM oxidation catalyst is a catalyst for directly oxidizing PM by activating $O_2$ in the exhaust gas, and is formed of cerium dioxide or the like.

In this third system, in a low-temperature oxidation region (350° C. to about 450° C.), PM is oxidized with $NO_2$ through the use of a reaction in which NO of oxidation catalyst is oxidized into $NO_2$. In a medium-temperature oxidation region (400° C. to about 600° C.), through the use of PM oxidation catalyst, $O_2$ in the exhaust gas is activated to oxidize PM through the use of a reaction in which PM is directly oxidized. In a high-temperature oxidation region (about 600° C. or higher) higher than temperature at which PM burns with $O_2$ in the exhaust gas, PM is oxidized with $O_2$ in the exhaust gas.

In these continuously regenerating type DPF systems, through the use of the oxidation reaction of PM due to the catalyst and $NO_2$, the temperature at which PM can be oxidized is lowered.

On the other hand, in exhaust gas from the diesel engine, the exhaust gas temperature varies as shown in FIG. 8 depending upon a load and a number of revolutions of the engine. For the reason, the DPF is not always in an optimum temperature state. When the exhaust gas temperature is in the low-temperature region, the activity of the catalyst decreases, and the PM cannot be sufficiently oxidized. Accordingly, there is a problem that it is difficult to have an excellent PM cleanup performance over the entire engine operating region.

As one of measures against this problem, there is an exhaust emission purification device for a diesel engine proposed in Japanese Patent Application No. 155894/2001 by the present inventor.

As shown in FIG. 5, this exhaust emission purification device is provided with: a first continuously regenerating type DPF 12A in an exhaust passage 9 of the engine; a bypass passage 101 on the upstream side of this first DPF 12A; a second continuously regenerating type DPF 13A provided in this bypass passage 101; and exhaust gas temperature rise means. This exhaust gas temperature rise means uses an intake throttle valve (intake shutter) 22, an exhaust gas introduction mechanism and an exhaust throttle valve (exhaust shutter) 23. In an engine operating state during idling or the like in which exhaust gas temperature is low, the exhaust gas temperature is raised to 300° C. or higher, and the exhaust gas is caused to flow into a bypass passage 101 to treat the exhaust gas through the use of a second continuously regenerating type DPF 13A.

In this exhaust emission purification device, a second continuously regenerating type DPF 13A consisting of the oxidation catalyst 131 and DPF 132 shown in FIG. 6 is, as shown in FIG. 5, arranged at a position closest to an exhaust manifold 4. This arrangement causes exhaust gas whose temperature has been raised by the exhaust gas temperature rise means to pass through the second continuously regenerating type DPF 13A before its temperature is not lowered even in the low exhaust gas temperature operating state.

With control of a change-over valve 102, when the exhaust gas temperature is within a predetermined low-temperature region, the exhaust gas is caused to pass through a second continuously regenerating type DPF 13A in the vicinity of the exhaust manifold, and when the exhaust gas temperature is within a predetermined high-temperature region, the exhaust gas is caused to flow through the first continuously regenerating type DPF 12A. Thereby, in the entire operating state region of the engine, the temperature of the exhaust gas passing through each DPF 122, 132 is set to 300° C. or higher.

The temperature of exhaust gas passing through each of these DPFs 12A and 13A is maintained at high temperature, whereby the activity of the oxidation catalyst 121, 131 is maintained and a reaction for oxidizing NO to $NO_2$ or the like is secured. Thereby, in the broad operating region of the engine, PM collected by DPF 122, 132 is reliably continuously oxidized to clean up the PM efficiently and reliably.

In this respect, since this second continuously regenerating type DPF 13A is employed when the exhaust gas temperature is low, and as an operating state of this engine, the operating state is at comparatively low load in many instances, the exhaust flow rate itself is less and the amount of PM in the exhaust gas is also comparatively small. For this reason, the capacity of the second continuously regenerating type DPF 13A can be set to smaller capacity than the first continuously regenerating type DPF 12A to be disposed in the exhaust passage.

This exhaust emission purification device, however, has a problem that it is not possible to sufficiently clean up NOx to be contained in the exhaust gas and NOx to be generated by an oxidation reaction in the continuously regenerating type DPF because a NOx catalyst 14 for cleaning up NOx is provided only behind the first continuously regenerating type DPF 12A.

In other words, for main NOx catalyst for use currently, there are SCR catalyst (selective contact catalyst) and NOx absorber reduction catalyst, and either has a region indicating a high rate of cleanup being 280° C. or higher as their characteristics are shown in FIGS. 3 and 7. For the reason, when any of these catalysts is employed, since in the engine operating state during idling and an operation at low load, the temperature of exhaust gas for flowing through this NOx catalyst becomes 100° C. to 200° C., the catalyst activity decreases, a rate of cleanup of NOx becomes 0 to 25%, and NOx cannot sufficiently be decreased.

BRIEF SUMMERY OF THE INVENTION

It is an object of the present invention to provide an exhaust emission purification system for a diesel engine capable of efficiently cleaning up not only PM but also NOx even in an engine operating state at low exhaust gas temperature such as an idling operation and a low load region operation and exhibiting excellent exhaust gas cleanup performance in an engine broad operating region.

In order to achieve the above-described object, there is provided an exhaust emission purification device for a diesel engine according to the present invention, comprising:

a first exhaust emission purification device, arranged in an exhaust passage of an engine, having a first continuously regenerating type diesel particulate filter and a first SCR catalyst;

a bypass exhaust passage placed side by side in an exhaust passage on the upstream side of the first exhaust emission purification device;

a second exhaust emission purification device, arranged in the bypass exhaust passage, having a second continuously regenerating type diesel particulate filter and a second SCR catalyst;

reducing agent supply means for NOx cleanup arranged upstream of a diverging portion of the bypass exhaust passage;

exhaust gas temperature region detection means for detecting an engine exhaust gas temperature region;

exhaust gas temperature rise means for raising exhaust temperature by means of combination of an intake throttle and an exhaust introduction mechanism for opening an exhaust passage of a cylinder during an intake stroke;

channel switching means for controlling the flow of exhaust gas to the bypass exhaust passage; and control means for controlling the exhaust gas temperature rise means and the channel switching means correspondingly to an exhaust gas temperature region obtained by detecting by the exhaust gas temperature region detection means, wherein the control means is constructed such that when the exhaust gas temperature region detection means detects that the exhaust gas temperature is within a predetermined low-temperature region, the exhaust gas temperature rise means raises the exhaust gas temperature, and the channel switching means switches the channel in such a manner that the exhaust gas flows through the bypass exhaust passage, and after causing the exhaust gas to pass through the second exhaust emission purification device, causes the exhaust gas to pass through the first exhaust emission purification device.

For these first and second continuously regenerating type DPFs, there can be employed a nitrogen dioxide regenerating type DPF consisting of an oxidation catalyst on the upstream side and a wall flow type filter on the downstream side, an integrated type nitrogen dioxide regenerating DPF system to be constituted by a wall flow type filter with catalyst obtained by coating the wall surface with an oxidation catalyst, a DPF system with PM oxidation catalyst composed of a precious metal oxidation catalyst such as platinum and a wall flow type filter with PM oxidation catalyst obtained by coating the wall surface with a PM oxidation catalyst, or the like.

As a NOx catalyst for decreasing NOx, the SCR catalyst is employed. A rate of NOx cleanup of this SCR catalyst is very high as shown in FIG. 3.

Also, the channel switching means is constituted by an open-close valve provided in an exhaust gas passage which goes side by side with the bypass exhaust passage. Or, the channel switching means can be constituted by a channel switching valve provided in a diverged part from the exhaust passage of the bypass exhaust passage or in a junction part to the exhaust passage.

For the exhaust gas temperature region detection means, there can be employed means for detecting the exhaust gas temperature region on the basis of such map data as exemplified in FIG. 4 which has been set in advance from the load and the number of revolutions of the engine, means for directly measuring temperature of the exhaust gas through the use of a temperature sensor provided in the exhaust passage or the like.

According to an exhaust emission purification system for a diesel engine having this structure, the following effects can be exhibited.

When the exhaust gas temperature is beyond the scope of the low-temperature region, high-temperature exhaust gas passes through the first exhaust emission purification device to activate an oxidation catalyst, a PM oxidation catalyst and the first SCR catalyst of the first continuously regenerating type DPF. As a result, the PM and NOx are cleaned up at a high rate of cleanup by the first exhaust emission purification device.

Also, when the exhaust gas temperature is within the scope of the low-temperature region, the exhaust gas temperature rise means raises the exhaust gas temperature and the channel switching means flows the exhaust gas into the bypass exhaust passage. The exhaust gas thus raised therefore passes through the second exhaust emission purification device. This second exhaust emission purification device is arranged on the upstream side, and it is more difficult to cool the exhaust gas than the first exhaust emission purification device. Therefore, the exhaust gas at high temperature raised activates the oxidation catalyst, PM oxidation catalyst and the second SCR catalyst of the second continuously regenerating type DPF. As a result, the PM and NOx are cleaned up at a high rate of cleanup by the second exhaust emission purification device.

In other words, when the exhaust gas temperature is within the high-temperature region, the PM and NOx can be efficiently cleaned up through the use of the first continuously regenerating type DPF and the first SCR catalyst, provided in the exhaust passage. Also, in an engine operating state in which the exhaust gas temperature during idling, during a low-load operation or the like is low and the amount of exhaust gas is also small, the PM and NOx can be efficiently cleaned up through the use of the second continuously regenerating type DPF with small capacity and the second SCR catalyst with small capacity, provided in the bypass exhaust passage in the vicinity of the exhaust manifold.

In the exhaust emission purification system for the diesel engine, the predetermined low-temperature region is characterized by the exhaust gas temperature being 300° C. or lower.

Also, in the exhaust emission purification system for the diesel engine, the second exhaust emission purification device is provided in the vicinity of the exhaust manifold or within the exhaust manifold. This structure enables the exhaust gas before the temperature lowers to flow into the second exhaust emission purification device.

Also, in the exhaust emission purification system for the diesel engine, the predetermined low-temperature region is divided into a first low-temperature region and a second low-temperature region lower than the first low-temperature region, and the structure is arranged such that when the exhaust gas temperature region detection means detects that the exhaust gas temperature is within the first low-temperature region, the exhaust gas temperature rise means controls to throttle back an intake throttle valve, and that when the exhaust gas temperature region detection means detects that the exhaust gas temperature is within the second low-temperature region, the exhaust gas temperature rise means controls to throttle back the intake throttle valve, and controls to introduce the exhaust gas into the cylinder during an intake stroke.

This structure enables exhaust gas at exhaust gas temperature suitable for activation of each catalyst with more caution and attentiveness to details to be supplied.

Also, in the exhaust emission purification system for the diesel engine, the structure is arranged such that when it controls to throttle back the intake throttle valve, the exhaust gas temperature rise means also control to throttle back an exhaust throttle valve. This structure will enable the exhaust gas temperature to be further raised.

In the general engine operating condition, therefore, the rate of cleanup for not only PM but also NOx can be greatly improved. Particularly, since the exhaust passage is switched depending upon the engine operating condition to thereby keep the temperature of the SCR catalyst through which the exhaust gas passes at 300° C. or higher at all times, it is possible to remarkably improve the rate of NOx cleanup, and theoretically, the NOx will be able to be 100% removed.

DETAILED DESCRIPTION OF THE INVENTION

With reference to the drawings, the description will be made of an exhaust emission purification system for a diesel engine according to embodiments of the present invention.

Figure 1:
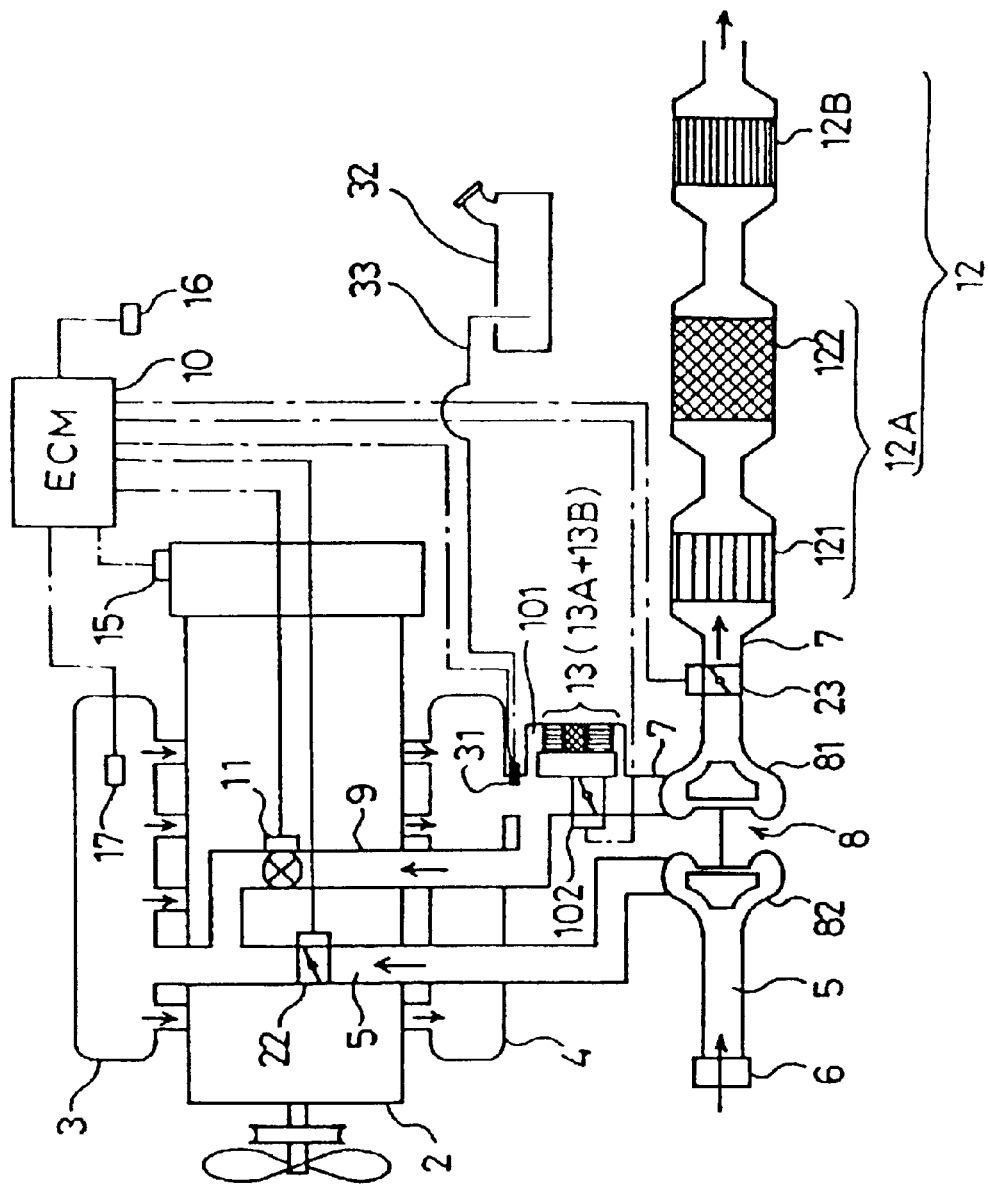
FIG. 1 is a view showing structure of an exhaust emission purification system for a diesel engine according to the present invention.

As shown in FIG. 1, in a diesel engine in which this exhaust emission purification system is employed, an intake pipe 5 connected to an intake manifold 3 provided in an engine body 2 is provided with an air cleaner 6, a compressor 82 of a turbocharger 8, and an intake throttle valve 22. Also, an exhaust pipe 7 to be connected to an exhaust manifold 4 is provided with an exhaust turbine 81 of the turbocharger 8, an exhaust gas throttle valve 23, and a first exhaust emission purification device 12. Thus, for EGR, there is provided an EGR pipe 9 equipped with an EGR valve 11, for connecting the exhaust pipe 7 and the intake pipe 5 together.

According to the present invention, with the exhaust pipe 7 on the upstream side of this first exhaust emission purification device 12, there is placed a bypass exhaust passage 101 provided with a second exhaust emission purification device 13 side by side. Further, a channel switching valve 102 is provided in the exhaust pipe 7 between a diverged part from the exhaust pipe 7 of the bypass exhaust passage 101 and a junction part to the exhaust pipe 7.

Figure 2:
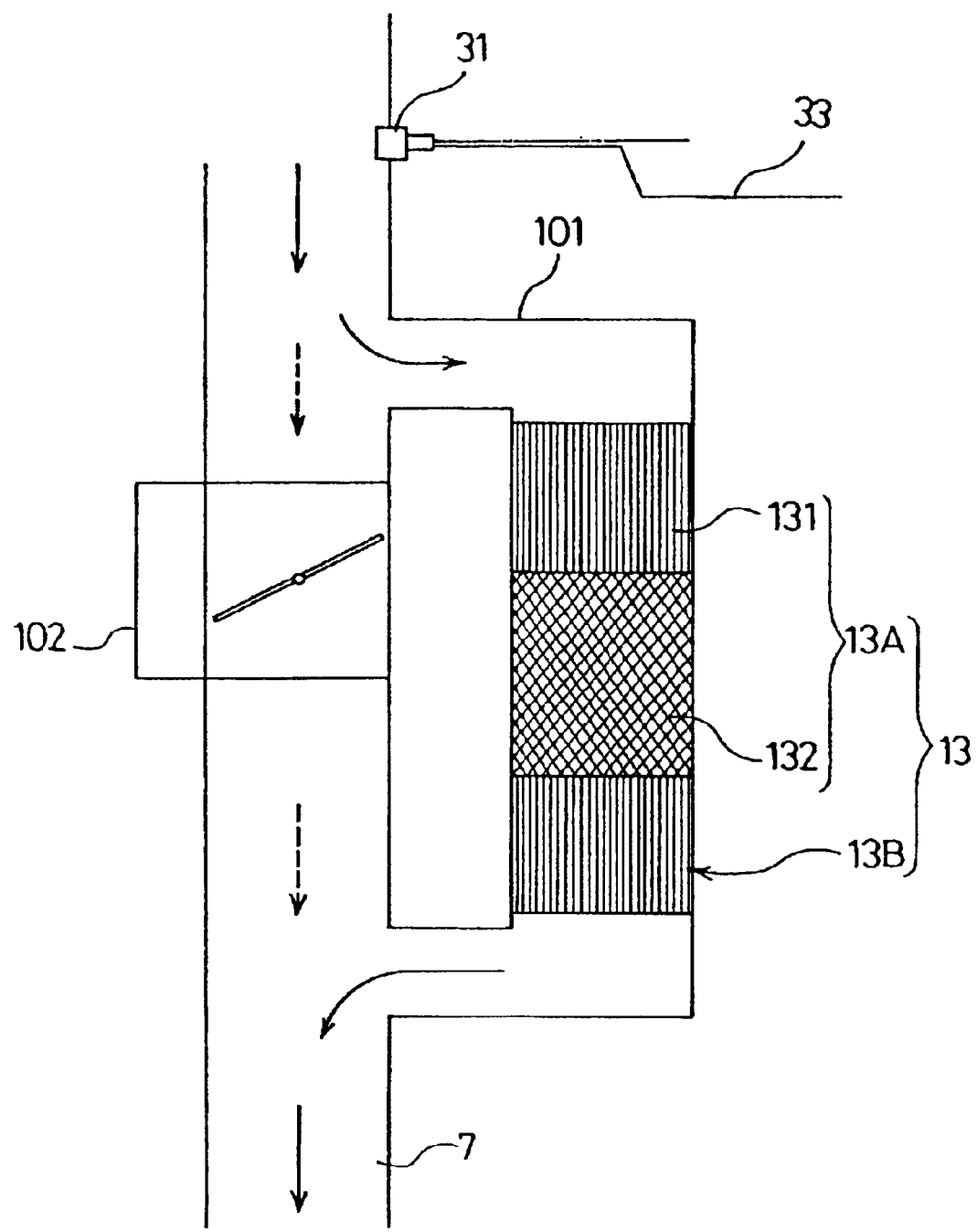
FIG. 2 is an enlarged view showing a second exhaust emission purification device of FIG. 1.

This first exhaust emission purification device 12 is composed of a first continuously regenerating type DPF 12A consisting of a first oxidation catalyst 121 and a first DPF 122, and a second SCR catalyst 12B. Also, the second exhaust emission purification device 13 is also similarly, as shown in FIG. 2, composed of a second continuous type DPF 13A consisting of a second oxidation catalyst 131 and a second DPF 132, and a second SCR catalyst 13B.

The first oxidation catalyst 121 and the second oxidation catalyst 131 are formed by forming a wash coat layer with active alumina or the like coated on the surface of a, for example, honeycomb carrier made of cordierite or refractory steel to cause this coat layer to carry a catalytic activation component made of precious metal such as platinum, vanadium or rhodium. These oxidation catalysts 121, 131 oxidize NO in the exhaust gas to generate $NO_2$ and oxidize unburned hydrocarbon and CO in the exhaust gas to generate $H_2O$ and $CO_2$.

The first DPF 122 and the second DPF 132 are formed by a honeycomb filter called, for example, "wall flow type", or a fiber type filter or the like. This honeycomb filter is formed by, for example, porous cordierite or silicon carbide, having a multiplicity of exhaust passages (cells), which is formed in parallel, and is formed by sealing the inlet side and outlet side in a zigzag shape respectively, and whose periphery has been enclosed with a porous wall surface. Also, the fiber type filter is formed by winding ceramic fiber around a stainless steel perforated pipe to stack. These DPFs 122 and 132 collect the PM in the exhaust gas.

Figure 3:
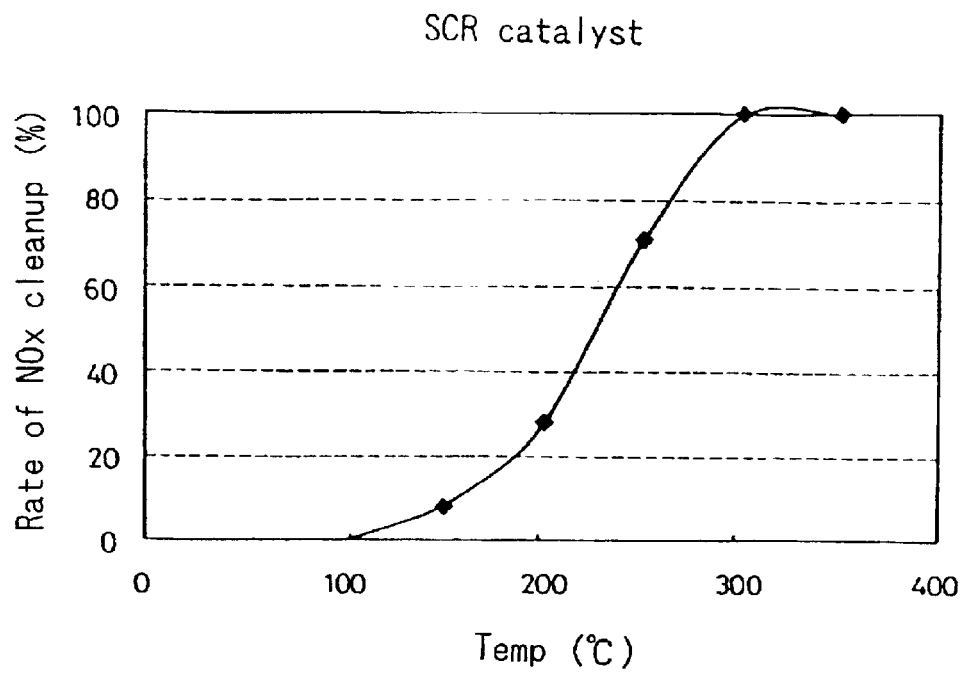
FIG. 3 is a view showing characteristics of a SCR catalyst.

The first SCR catalyst 12B and the second SCR catalyst 13B are catalysts which are also called "selective contact reduction catalyst", and reduce NOx with ammonia that is generated from urea aqueous liquid, ammonia water or liquid ammonia. These SCR catalysts are formed with alumina, titania or the like, as a carrier, which has been formed in a pellet shape or in a honeycomb shape and with platinum, vanadium oxide, iron oxide, copper oxide, manganese oxide, chrome oxide, molybdenum oxide or the like as an active member. These SCR catalysts have such very excellent NOx cleanup characteristics as shown in FIG. 3.

Figure 7:
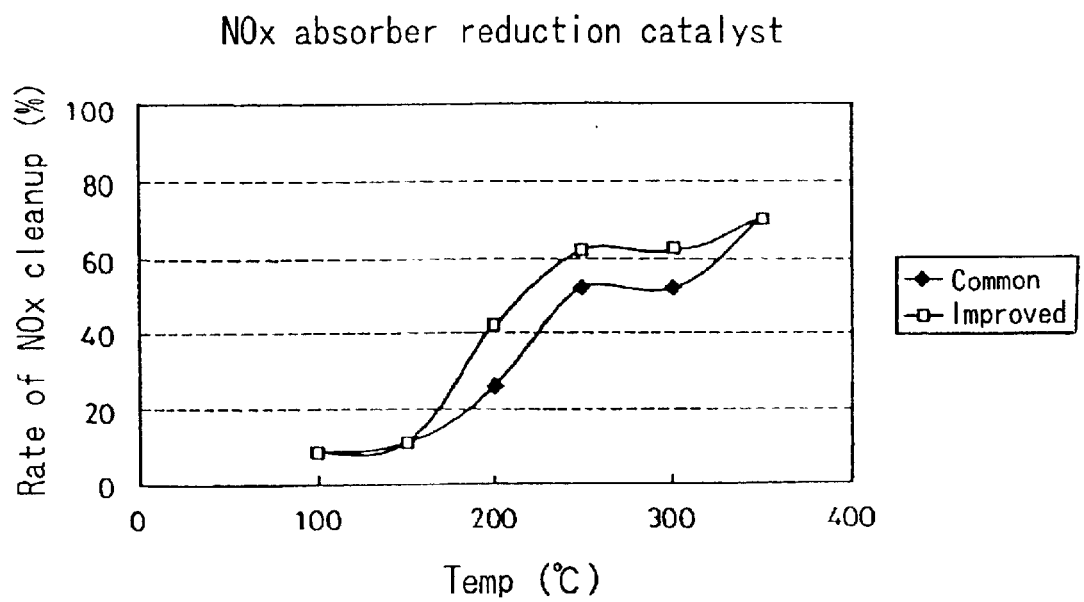
FIG. 7 is a view showing characteristics of a NOx absorber reduction catalyst.
Figure 8:
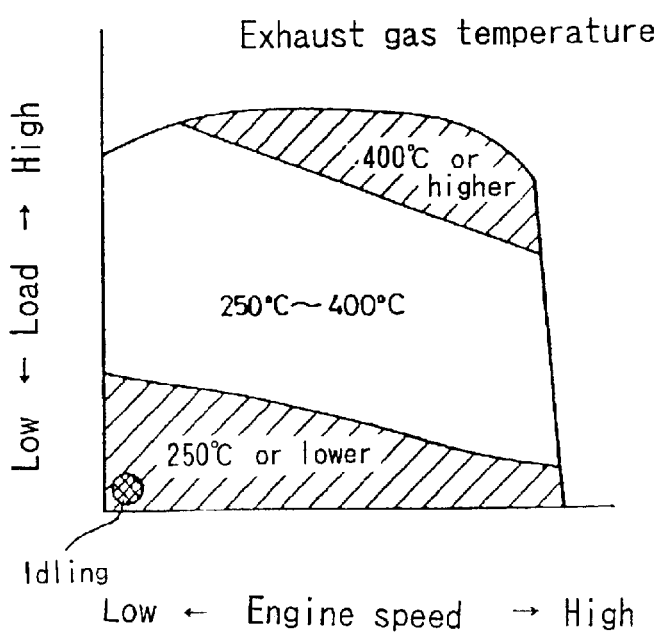
FIG. 8 is a view showing an example of relationship between a number of revolutions and a load, and exhaust gas temperature in a diesel engine.

As a catalyst for cleaning up NOx, this SCR catalyst is employed instead of NOx absorber reduction catalyst having such cleanup characteristics as shown in FIG. 7, whereby the NOx cleanup performance can remarkably be improved.

However, since the exhaust gas is flowed into this second exhaust emission purification device 13 only when the amount of exhaust gas is comparatively small with the exhaust gas temperature being within the low-temperature region, this second exhaust emission purification device 13 is formed to have smaller capacity than the capacity of the fist exhaust emission purification device 12.

This second exhaust emission purification device 13 is provided within the exhaust manifold 4 or in the vicinity thereof. This structure causes the exhaust gas before the temperature lowers to flow into the second exhaust emission purification device 13.

Also, a urea injector (injector for supplying reducing agent) 31 for supplying urea (reducing agent) as a reducing agent for cleaning up the NOx is arranged upstream of the diverged part of the bypass exhaust passage 101. Also, there will be provided a urea tank (reducing agent tank) 32 and an urea feed pipe (reducing agent feed pipe) 33 for connecting them together. In addition, a solenoid of this urea indicator 31 will be controlled by the control device 10 to inject the urea and to adjust the injection amount. These devices constitute reducing agent supplying means for cleaning up the NOx.

Also, there are provided the exhaust gas temperature region detection means for detecting the engine exhaust gas temperature region, the exhaust gas temperature rise means for raising the exhaust gas temperature and the channel switching means for controlling the flow of the exhaust gas to the bypass exhaust passage. Further, control means for controlling these exhaust gas temperature region detection means, exhaust gas temperature rise means and channel switching means is provided within the control device 10.

Figure 4:
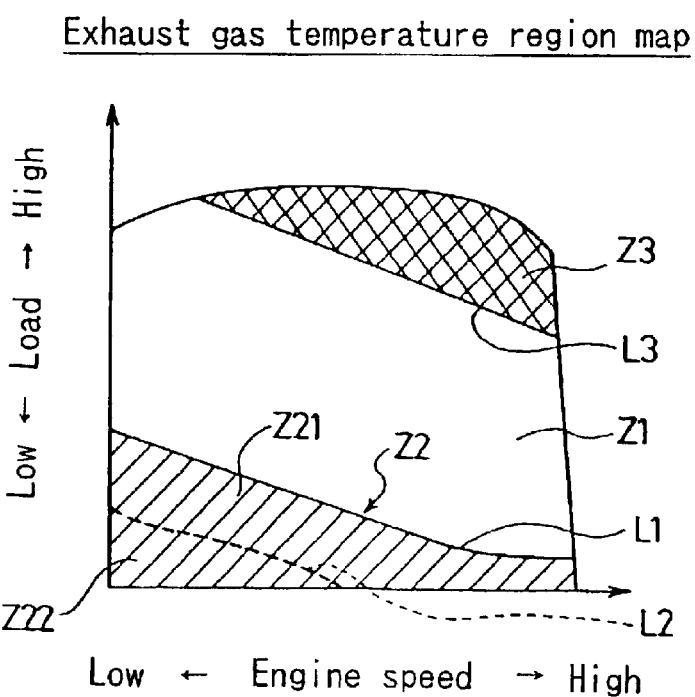
FIG. 4 is a view showing an example of an exhaust gas region map to be used by exhaust gas temperature region detection means according to the present invention.
Figure 5:
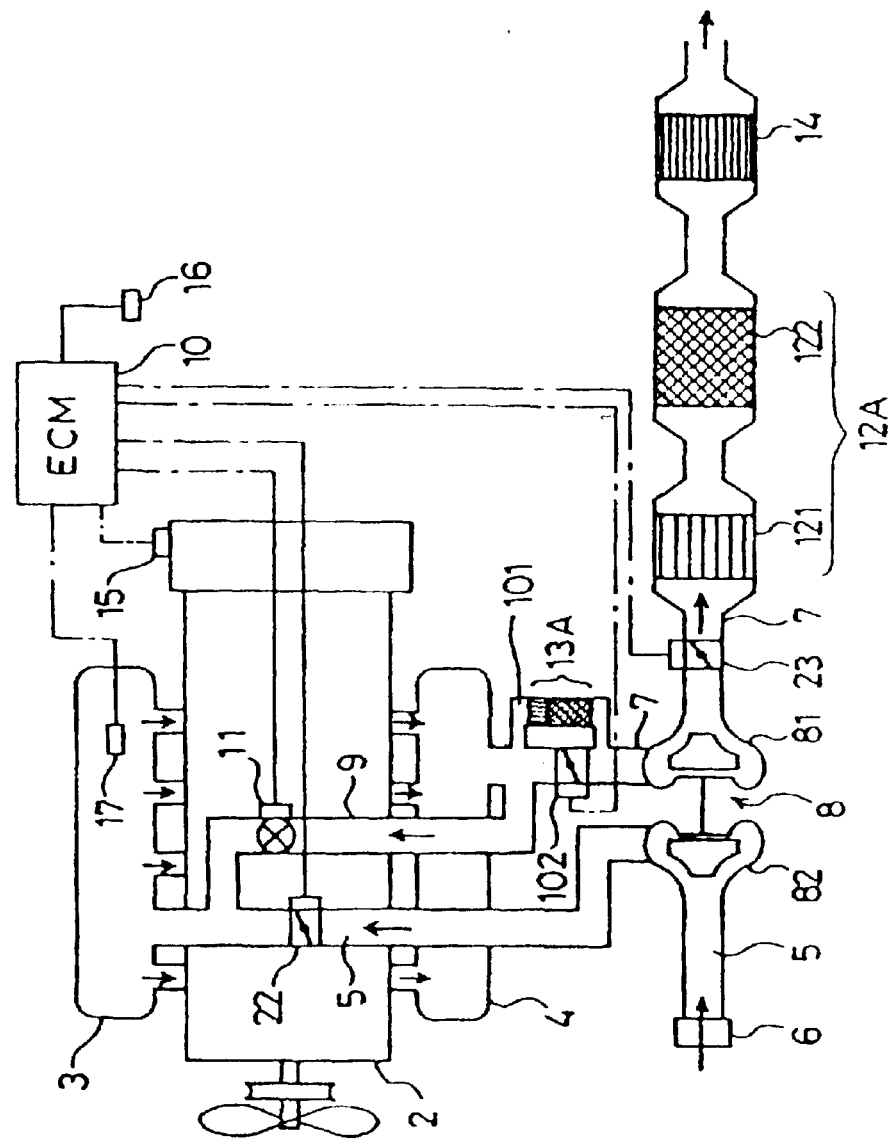
FIG. 5 is a view showing structure of an exhaust emission purification system for a diesel engine according to the prior art.
Figure 6:
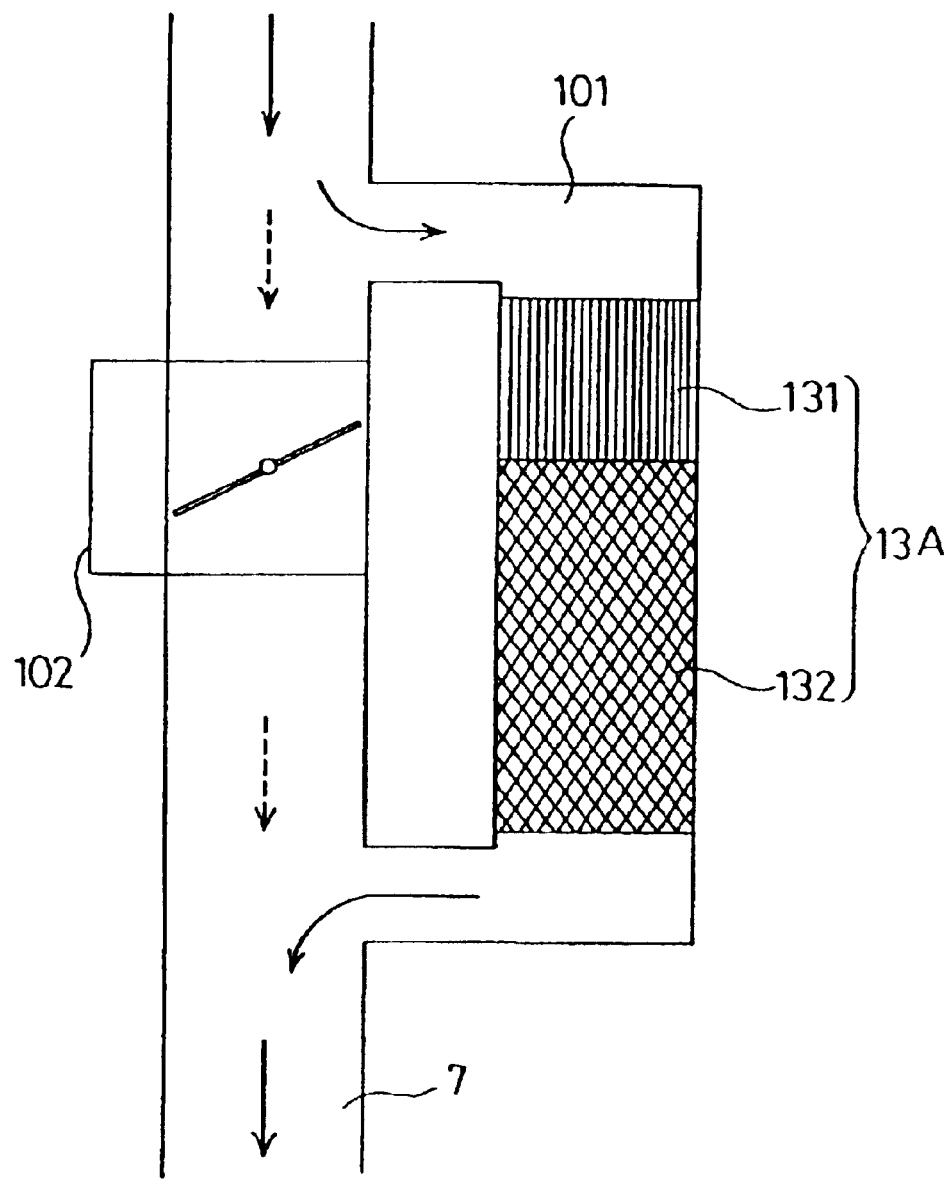
FIG. 6 is an enlarged view showing the second continuously regenerating type DPF of FIG. 5.

This exhaust gas temperature region detection means is formed by means for judging the exhaust gas temperature region through the use of such an exhaust gas temperature region map as exemplified in FIG. 4 from the load and the number of revolutions of the engine based on predetermined map data.

This load is detected by means of an acceleration sensor 16 which is engine load detection means, and this number of revolutions is detected by means of an engine speed detection sensor 15 which is number of revolutions detection means. In this respect, in place of this means, there may be adopted means for directly measuring temperature of the exhaust gas through the use of a temperature sensor (not shown) provided in the exhaust passage 7.

Also, the exhaust gas temperature rise means is formed by means of combination of an intake throttle valve 22 and an exhaust introduction mechanism for opening an exhaust passage of a cylinder during an intake stroke. In this respect, so as to be able to further raise the temperature as the need arises, the exhaust gas temperature rise means may be constructed to add an exhaust throttle valve 23.

This exhaust introduction mechanism is, in an exhaust cam which raises and lowers the exhaust valve to conduct opening and closing of the exhaust hole, formed by adopting a cam profile by which the exhaust valve is opened during the exhaust stroke. Or, this exhaust introduction mechanism is formed by adopting an exhaust introduction passage through which the interior of the exhaust passage of the same cylinder communicates to the interior of the cylinder, and an exhaust introduction valve, disposed in this exhaust introduction passage, for opening the interior of the exhaust passage within the same cylinder to the cylinder during the intake stroke.

Also, the channel switching means is formed by the channel switching valve 102 and the like. In this channel switching valve 102, while keeping a watch on an operating state of the engine through the use of the exhaust gas temperature region detection means, a valve opening is controlled by a control device 10 called "ECM" for controlling the operation of the engine.

In this respect, in order to perform EGR, an EGR passage 9 is provided so as to diverge from the exhaust pipe 7 upstream of the channel switching valve 102 and to merge into the exhaust pipe 7 downstream of the intake throttle valve 22.

In the exhaust emission purification system having the above-described structure, control is performed as below.

On operating the engine, when the exhaust gas temperature region detection means detects from the load and number of revolutions of the engine that the exhaust gas temperature is within a suitable temperature region Z1 which is higher than a first predetermined temperature line L1 and is lower than a third predetermined temperature line L3, the channel switching means opens the channel switching valve 102 to cause a major portion of the exhaust gas to directly flow into the first exhaust emission purification device 12. At this time, both the intake throttle valve 22 and the exhaust throttle valve 23 are controlled at full open. Also, the valve opening of the EGR valve is adjusted and controlled so as to obtain an amount of EGR suitable for the respective operating state, or is controlled at full open. This first predetermined temperature line L1 is a line at which the exhaust gas temperature exceeds 250° C. or preferably exceeds 300° C.

When it detects that the exhaust gas temperature is within a low-temperature region Z2 (first low-temperature region Z21 or second low-temperature region Z22) lower than a predetermined temperature line L1, the exhaust gas temperature region detection means controls to raise the exhaust gas temperature by operating the exhaust gas temperature rise means, and controls to close the channel switching valve 102 by means of the channel switching means. Thus, this valve closing causes the exhaust gas to flow into the bypass exhaust passage 101, and after causing the exhaust gas to pass through the second exhaust emission purification device 13, causes it to pass through the first exhaust emission purification device 12.

This exhaust gas temperature rise means operates when the exhaust gas temperature region detection means detects that the exhaust gas temperature is within the first low-temperature region Z21 which is lower than the first predetermined temperature line L1 and is higher than the second predetermined temperature line L2. Thus, an operation of this exhaust gas temperature rise means throttles the valve openings of the intake throttle valve 22 and the exhaust throttle valve 23 in accordance with the respective valve opening maps which have been set in advance. In this respect, the EGR valve 11 will be opened.

Since this throttling of the intake throttle valve 22 reduces the inflow of the intake air and the pressure within the intake passage 5 lowers, the amount of EGR increases. Also, since when throttling of the exhaust throttle valve 23 is added, the exhaust pressure within the exhaust passage 7 and the EGR passage 9 increases, the amount of EGR is further increased. Since an excess air ratio comes close to 1.0 due to the decrease in the amount of the intake air, and since the increase in amount of inclusion of EGR gas raises intake temperature of the intake air, the exhaust gas temperature is raised.

Also, when the exhaust gas temperature region detection means detects that the exhaust gas temperature is within the second low-temperature region Z22 which is further lower than the first low-temperature region Z21 and is lower than the second predetermined temperature line L2, the exhaust gas temperature rise means performs the following operation. It throttles the valve openings of the intake throttle valve 22 and the exhaust throttle valve 23 in accordance with the respective valve opening maps which has been set in advance. Also, the exhaust gas temperature rise means opens the EGR valve 11, and further operates the exhaust introduction mechanism to introduce high-temperature exhaust gas into the cylinder during the intake stroke for raising the exhaust gas temperature. When the exhaust throttle valve 23 is throttled and the exhaust pressure is increased at this time, much exhaust gas is introduced into the cylinder during the intake stroke, and therefore, the exhaust gas temperature will be further raised.

In this respect, when it detects from the load and the number of revolutions of the engine that the exhaust gas temperature is high and is within a high-temperature region Z3 higher than the third predetermined temperature line L3 which is higher than activation temperature of the oxidation catalyst 121, the exhaust gas temperature region detection means performs the following operation.

The exhaust gas temperature region detection means controls both an intake throttle valve 22 and an exhaust throttle valve 23 at full open, and opens the channel switching valve 102 by means of the channel switching means. Also, the exhaust gas temperature is lowered through the use of exhaust gas temperature lowering means, for example, such as control of increase in the amount of intake air due to a variable turbocharger or cooling of exhaust gas due to cooling water.

With this structure and control, when the exhaust gas temperature is within the high-temperature region Z1, Z3, the first exhaust emission purification device 12 cleans up the exhaust gas. In this case, since the exhaust gas flowing into the first exhaust emission purification device 12 is high in temperature, both the first oxidation catalyst 121 and the first SCR catalyst 12B enter a comparatively high temperature state, and PM and NOx can efficiently be cleaned up in an advanced state of activation of the catalyst.

When the exhaust gas temperature during idling or during an operation at low load is within the first and second low-temperature regions Z21 and Z22, the exhaust gas temperature rise means is operated to clean up the exhaust gas. In this case, by means of throttling of the intake throttle valve 22 and the exhaust throttle valve 23, and introduction of exhaust gas into the cylinder during the intake stroke by an operation of the exhaust introduction mechanism, the exhaust gas temperature is raised and the exhaust gas raised in temperature passes through the second exhaust emission purification device 13 to be cleaned up.

This second exhaust emission purification device 13 can be arranged in a position closest to the exhaust manifold because of its small capacity. For the reason, it is difficult to cool the exhaust gas, and the temperature of the second oxidation catalyst 131 and the second SCR catalyst 13B does not lower to a large degree either, and therefore, PM and NOx can be efficiently cleaned up in an activated state of the catalyst.

Therefore, according to this exhaust emission purification system, when the exhaust gas temperature is within the high-temperature region, by means of the first continuously regenerating type DPF 12A and the first SCR catalyst 12B which have been provided in the exhaust passage, it is possible to efficiently clean up the PM and NOx, and in an engine operating state at low exhaust gas temperature such as during idling and during an operation at low load, by means of the second continuously regenerating type DPF 13A and the second SCR catalyst 13B which have been arranged in the bypass exhaust passage in the vicinity of the exhaust manifold, the PM and NOx can be efficiently cleaned up.

In the general operating state of the engine, therefore, it becomes possible to greatly improve the rate of NOx cleanup.

Particularly, since the exhaust passage can be switched to thereby keep the temperature of the SCR catalyst through which the exhaust gas passes at 300° C. or higher at all times, it becomes possible to theoretically 100% remove the NOx.

In this respect, in the above-described embodiment, the description has been made of the nitrogen dioxide regenerating type DPF system as the continuously regenerating type DPF, and the present invention is not limited thereto, but it may be possible to adopt an integrated type nitrogen dioxide regenerating DPF, a DPF with PM oxidation catalyst, and such a continuously regenerating type DPF or the like as to continuously burn PM collected by taking advantage of active oxygen which occurs when absorbing and reducing the NOx by causing the DPF to carry a NOx absorber reduction type catalyst.

What is claimed is:

1. An exhaust emission purification device for a diesel engine, comprising:
   a first exhaust emission purification device, arranged in an exhaust passage of an engine, having a first continuously regenerating type diesel particulate filter and a first SCR catalyst;
   a bypass exhaust passage placed side by side with an exhaust passage upstream of said first exhaust emission purification device;
   a second exhaust emission purification device, arranged in said bypass exhaust passage, having a second continuously regenerating type diesel particulate filter and a second SCR catalyst;
   reducing agent supply means for $NO_x$ cleanup arranged upstream of a diverging portion of said bypass exhaust passage;
   exhaust gas temperature region detection means for detecting an exhaust gas temperature region of the engine;
   exhaust gas temperature rise means for raising exhaust temperature;
   channel switching means for controlling the flow of exhaust gas to said bypass exhaust passage; and
   control means for controlling said exhaust gas temperature rise means and said channel switching means correspondingly to an exhaust gas temperature region obtained by detecting by said exhaust gas temperature region detection means, wherein
   said control means is constructed such that when said exhaust gas temperature region detection means detects that said exhaust gas temperature is within a predetermined low-temperature region,
   said exhaust gas temperature rise means raises said exhaust gas temperature, and said channel switching means switches the channel in such a manner that the exhaust gas flows through said bypass exhaust passage, and after causing the exhaust gas to pass through said second exhaust emission purification device, causes the exhaust gas to pass through said first exhaust emission purification device,
   when it is detected by the gas temperature region detection means that the exhaust gas temperature is not in the prescribed low temperature region, the control means causes the channel switching means to switch the flow path so as not to permit a major portion of the exhaust gas to flow through the bypass exhaust passage, thereby causing the major portion of the exhaust gas not to flow through the second exhaust emission purification device but to flow through the first exhaust emission purification device alone.

2. The exhaust emission purification device for a diesel engine according to claim 1, wherein said predetermined low-temperature region is divided into a first low-temperature region and a second low-temperature region lower than said first low-temperature region, and
   when said exhaust gas temperature region detection means detects that the exhaust gas temperature is within said first low-temperature region, exhaust gas temperature rise means controls to throttle back an intake throttle valve, and
   when said exhaust gas temperature region detection means detects that the exhaust gas temperature is within said second low-temperature region, the exhaust gas temperature rise means controls to throttle back the intake throttle valve, and controls to introduce the exhaust gas into the cylinder during an intake stroke.

3. An exhaust emission purification device according to claim 1, wherein said exhaust gas temperature rise means raises the exhaust gas temperature by an intake throttle in combination with an exhaust introduction mechanism for opening an exhaust passage of a cylinder during an intake stroke.

4. The exhaust emission purification device for a diesel engine according to claim 1, wherein said predetermined low-temperature region is specified by the exhaust gas temperature of 300° C. or lower.

5. An exhaust emission purification device according to claim 4, wherein said exhaust gas temperature rise means raises the exhaust gas temperature by an intake throttle in combination with an exhaust introduction mechanism for opening an exhaust passage of a cylinder during an intake stroke.

6. The exhaust emission purification device for a diesel engine according to claim 1, wherein said second exhaust emission purification device is provided in the vicinity of an exhaust manifold or within the exhaust manifold.

7. An exhaust emission purification device according to claim 6, wherein said exhaust gas temperature rise means raises the exhaust gas temperature by an intake throttle in combination with an exhaust introduction mechanism for opening an exhaust passage of a cylinder during an intake stroke.

8. The exhaust emission purification device for a diesel engine according to claim 1, wherein when controlling to throttle back the intake throttle valve, said exhaust gas temperature rise means also control to throttle back an exhaust throttle valve.

9. An exhaust emission purification device according to claim 8, wherein said exhaust gas temperature rise means raises the exhaust gas temperature by an intake throttle in combination with an exhaust introduction mechanism for opening an exhaust passage of a cylinder during an intake stroke.

* * * * *